United States Patent

Evans et al.

Patent Number: 5,291,209
Date of Patent: Mar. 1, 1994

[54] COHERENT SIDE LOBE CANCELER

[75] Inventors: Norol T. Evans, San Pedro; Richard F. Hyneman, Fullerton, both of Calif.

[73] Assignee: Hughes Aircraft Company, Los Angeles, Calif.

[21] Appl. No.: 413,402

[22] Filed: Nov. 2, 1973

[51] Int. Cl.⁵ .......................... G01S 3/16; G01S 3/28
[52] U.S. Cl. ................................... 342/381; 342/384
[58] Field of Search .................. 343/100 LE; 342/381, 342/384

[56] References Cited

U.S. PATENT DOCUMENTS

| | | | |
|---|---|---|---|
| 3,094,695 | 6/1963 | Jahn | 343/100 LE |
| 3,202,990 | 8/1965 | Howells | 343/100 LE |
| 3,222,602 | 12/1965 | Gager et al. | 343/7.7 |
| 3,766,559 | 10/1973 | Butcher, Jr. et al. | 343/100 LE |

*Primary Examiner*—Theodore M. Blum
*Attorney, Agent, or Firm*—Wanda K. Denson-Low

[57] ABSTRACT

The elimination of jamming signals from received radar signals is conventionally accomplished by side lobe cancellation techniques. Large interfering signals caused either by clutter or other sources, however, can cause intolerable degradation of coherent side lobe cancellation (CSLC) systems. In the present invention an inhibit signal is used to open the input to the coherent side lobe cancellation error sensing circuits thus preventing large signals from entering the coherent side lobe cancellation loop. Large signals entering coherent side lobe cancellation loops give rise to erroneous transients in the output. The invention effects storage of previously sensed error signals so as to continue jammer cancellation until new data become available to update the error signals. The inhibit signal is generated by a combination of coherent side lobe cancellation sensing circuits and logic control circuits that determine when an inhibit signal should be generated. When an inhibit signal is not present, the coherent side lobe cancellation loop operates in its normal fashion. During intervals when excessive clutter or signal is present on the main channel, an inhibit signal is generated causing the occurrence of two actions in the coherent side lobe cancellation loop. First, the inhibit signal opens a switch at the output of the correlation mixer so that no input is accepted into the coherent side lobe cancellation loop for a time interval, thereby preventing the large signal from disturbing the loop operation. Second and simultaneously, the inhibit signal causes a sample-and-hold circuit to sample the loop filter output thereby preventing the loops from relaxing during this time interval.

16 Claims, 6 Drawing Sheets

COHERENT SIDE LOBE CANCELER

BACKGROUND OF THE INVENTION

1. Field of the Invention

This invention relates to radar systems and more particularly to coherent side lobe cancellation sensing and control functions.

2. Description of the Prior Art

A side lobe suppression system has been described by D. M. Jahn, *Antenna Side-lobe Suppression System*, U.S. Pat. No. 3,094,695. Jahn teaches a system in which both a directional antenna and an omni-directional antenna are provided, each having an independent receiving system channel. The gain of the omni-directional antenna-receiver combination is provided to be substantially equal to the principal side lobe signal gain of the directional antenna-receiver combination. Thus the magnitude of a signal received in the principal side lobe of the directional antenna will be substantially equal to the magnitude of that same signal as received in the omni-directional antenna. However, a signal received in the main beam of the directional antenna will be considerably larger than either of the aforementioned signals. In Jahn these signals are coupled to a first gate such that when the signal received in the omni-directional antenna is equal in magnitude to the signal received in the directional antenna, that is, there is no signal in the main beam of the directional antenna, a signal called a blanking signal is applied to a second gate. This blanking signal operates to block the presentation of signals from the directional antenna upon a display device. These two signals, coupled to said first gate, are called a blanking signal as derived from said omni-directional antenna channel and an enabling signal as derived from said directional antenna channel. It should be noted that the blanking signal applied to the first gate is not identical with the blanking signal applied to the second gate, however, this is the nomenclature as used in Jahn.

When the signal as received in the directional antenna is considerably larger than the signal as received in the omni-directional antenna, indicating the presence of a signal in the main beam of the directional antenna, a third signal is produced proportional to the difference in the magnitudes of the signals. This third signal, when applied to said first gate, disables it and prevents the formation of a blanking signal to said second gate thus allowing presentation of the display of a signal received in the main beam of the directional antenna. Thus signals received in the side lobes but not in the main beam of a directional antenna pattern are eliminated while signals received in the main beam are displayed.

A side lobe cancellation system has also been described by T. W. Howells, *Intermediate Frequency Side Lobe Canceller*, U.S. Pat. No. 3,202,990. It is to be noted that Jahn, supra, used two separate receiving channels, one for the directional antenna and another for the omni-directional antenna and utilized a difference in received signal magnitude in order to accomplish elimination of jamming at the video level. Howells points out that the disadvantage of such an approach is that it requires matching two complete receivers in band pass, time delay and amplitude response. In addition, all intermediate frequency signal processing equipment used with the radar must be completely duplicated if video side lobe cancellation is to be accomplished. Howells, therefore, as indicated by his title, seeks to accomplish side lobe cancellation without matching two complete receivers, by performing such cancellation as a function of intermediate frequencies. In Howells, advantage is taken of the phenomenon that the form of jamming signals received by the two antennas differs only by a gain term and a phase shift caused by the path length difference experienced by the wave front due to the physical separation of the two antennas. In order to effect cancellation of the jamming signal, the signal from the omni-directional antenna is heterodyned by means of a first local oscillator down to a first intermediate frequency and the signal from the directional antenna is heterodyned by means of a second local oscillator down to a second and different intermediate frequency.

These two intermediate frequencies are again heterodyned and narrow band filtered resulting in the production of yet another signal whose frequency is equal to the difference between said first and second intermediate frequencies. The amplitude of this resulting signal is proportional to the average power of the jammer and has the phase of the jamming signal as received at the omni-directional antenna. This signal is again heterodyned with the jamming signal which produces a signal now at the radar intermediate frequency that is phase equalized and with an amplitude proportional to the average power of the jammer. This last signal is introduced to the radar intermediate frequency channel through a subtraction circuit in such a way that the residual jammer signal approaches zero in the radar intermediate frequency channel. It is a feature of the teaching of Howells's invention that the system defined cancels signals which have a relatively high power, while it is relatively insensitive to target returns having a low average power. It is to be noted in connection with this feature that the power density at the radar from a target echo is proportional to the inverse fourth power of the distance between radar and target while the power density at the radar from a jammer is proportional to the inverse second power of the distance between radar and jammer.

Charles S. Gager et al have described a cancellation system using an ultra sonic delay line in *Apparatus for Double Cancellation Utilizing One Delay Line in a Moving Target Indicating System*, U.S. Pat. No. 3,222,602. The invention takes advantage of the fact that input signals to moving target indicator systems exhibit the characteristic that fixed targets have a constant amplitude from one interpulse period to the next, however, due to the Doppler frequency beat between return target signals from a moving target and the radar reference signal, moving targets show a variable amplitude from one interpulse period to the next. In accomplishing the double cancellation of the invention, an intermediate frequency carrier is first modulated with radar echo pulses and then passed simultaneously through a direct line and a delay line. These signals are then amplitude detected and the signal from the direct line is subtracted from the delayed signal. The resulting difference signal is then used to phase modulate the original intermediate frequency carrier. By comparing the phase between the direct and delayed carrier signals in a phase detector, a double cancellor video output may be extracted therefrom.

SUMMARY OF THE INVENTION

The proposed coherent side lobe canceler allows the radar system so equipped to operate in an environment containing large clutter and interfering signal pulses without degradation of coherent cancellation due to the effects of such large clutter or signal returns. The actual use of coherent side lobe cancellation in an operational radar system requires the solution of several problems. The system of the invention concentrates on the large signal or clutter problem. This effect will eliminate the degradation in coherent side lobe cancellation operation caused by clutter on the auxillary channel over most of the surveillance volume. However, large signals on the main channel such as clutter, exceeding a given threshold, if allowed to enter the coherent side lobe cancellation loops, will generate cross modulation products that seriously degrade the system loop performance. In the invention these signals are prevented from entering the coherent side lobe cancellation system by inhibit signal technique. Also, large interfering pulses originating on the antenna side lobes cause transient effects in the loop that further degrade performance. An inhibit signal is generated by a combination of coherent side lobe cancellation sensing circuits and some logic control circuits that determine when an inhibit signal should be generated. Basically the inhibit signal is used to open the input to the coherent side lobe cancellation error sensing circuits and to simultaneously sample and hold the output of the coherent side lobe cancellation error circuits. This prevents large signals from entering the coherent side lobe cancellation loops, thus generating erroneous transients in the output. It also allows the previously sensed error signals to be stored and used to continue cancellation of the jammers until new data become available to update the error signals.

It is therefore an object of this invention to provide an improved coherent side lobe cancellation.

It is a further object of this invention to provide an inhibit signal which effectively prevents excessively large signals from entering the coherent side lobe cancellation loops.

It is still another object of this invention to produce an inhibit signal through the action of the coherent side lobe cancellation sensing circuits and associated logic circuits.

It is also an object of this invention to provide sample-and-hold circuits preventing the coherent side lobe cancellation loops from relaxing during the inhibit signal interval so that jamming cancellation can continue during this period of time.

BRIEF DESCRIPTION OF THE DRAWINGS

These and other objects, features and advantages of the invention itself will become apparent to those skilled in the art in the light of the following detailed description taken in consideration with accompanying drawings wherein like reference numerals indicate like corresponding parts throughout the several parts wherein.

Figure 1:
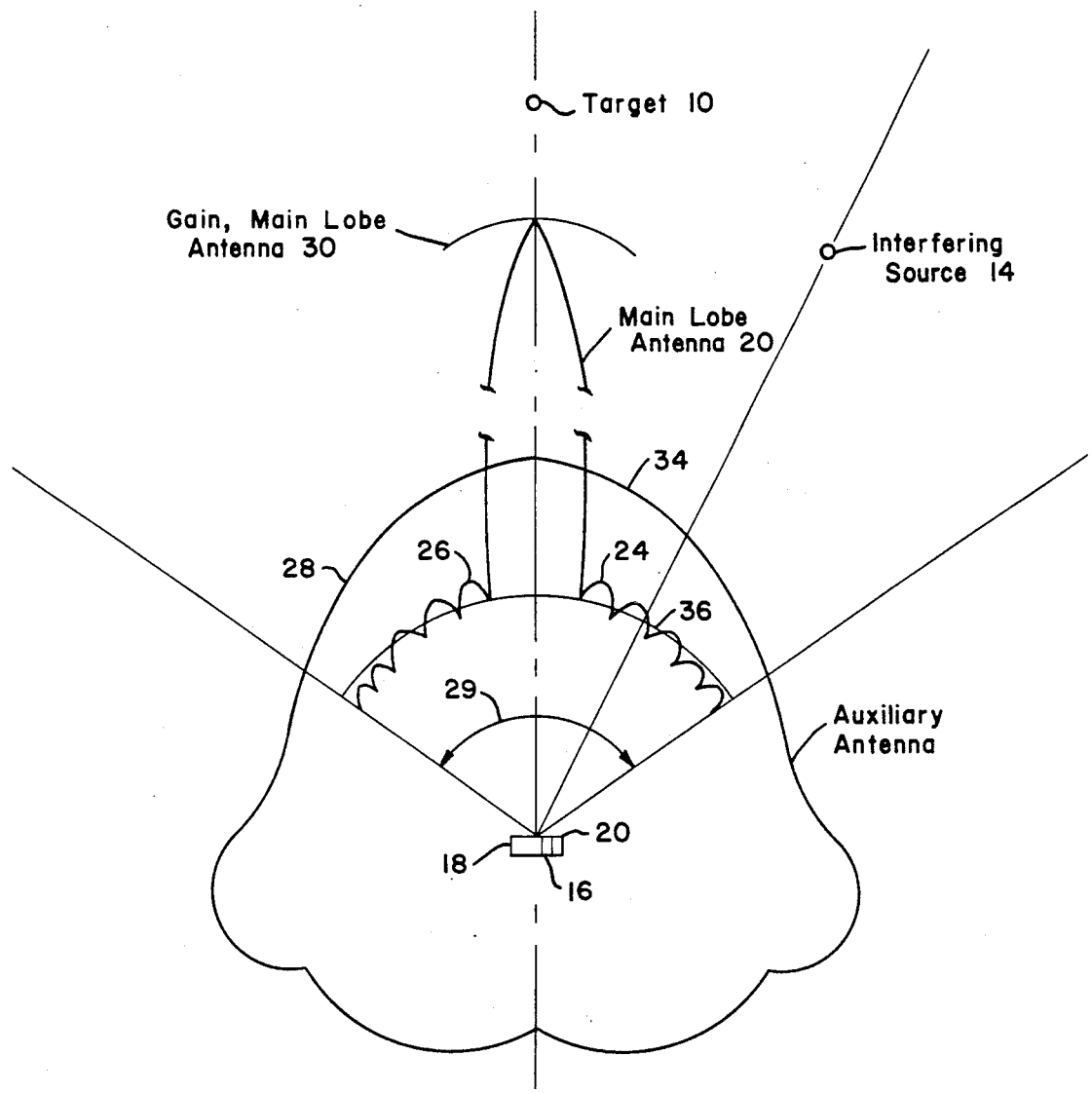
FIG. 1 is a schematic plan view showing the gain charateristics of a main lobe antenna and an auxiliary antenna.

Referring first to FIG. 1, general operation of a side lobe blanking system will be first explained relatively to a target 10 and an interfering source 14. An antenna system 16 may include a main lobe or radar antenna 18 and a side lobe or auxiliary antenna 20-, normally positioned adjacent to each other or in close proximity. The antennas 18 and 20 may be different aperture elements in the same array or may be parabolic dish type antennas placed substantially close to each other. The radar antenna 16 has a main lobe pattern 20 and a plurality of side lobe patterns such as 24 and 26. The auxiliary antenna 18 which is a side lobe antenna may be a low gain antenna and have an antenna pattern such as 28 which may be of a substantially constant amplitude over an azimuth receiver range of an angle 29. The gain of the main lobe antenna is shown by a line 30 and the gain of the side lobe antenna 18 is shown by line 34.

The side lobes of the radar antenna have a general amplitude indicated by a line 36 and a gain between that of the side lobe or auxiliary antenna 28 and the side lobe antenna gain of the line 36 may be a selected decibel value. Energy from the interfering source 14 has a gain in the side lobe antenna indicated by the line 34 and a gain in the main lobe antenna indicated by the line 36. Thus, energy received from the source 14 is interpreted as side lobe energy, to be blanked out in response to a comparison of the side lobe signal amplitude to the radar signal amplitude in which the side lobe signal amplitude is larger. The interfering source 14 may be any operating radar system providing interference energy, a side lobe repeater, as is well known in the art, or any pulsed interference generator responsive to the received pulse repetition frequency, for example, or for that matter, any source of clutter. This effect will eliminate the degradation in coherent side lobe cancellation operation caused by clutter on the auxiliary channel over most of the surveillance volume. However, excessively large signals on the main channel, if allowed to enter the coherent side lobe cancellation loops, will generate cross modulation products that seriously degrade the system performance.

Figure 2:
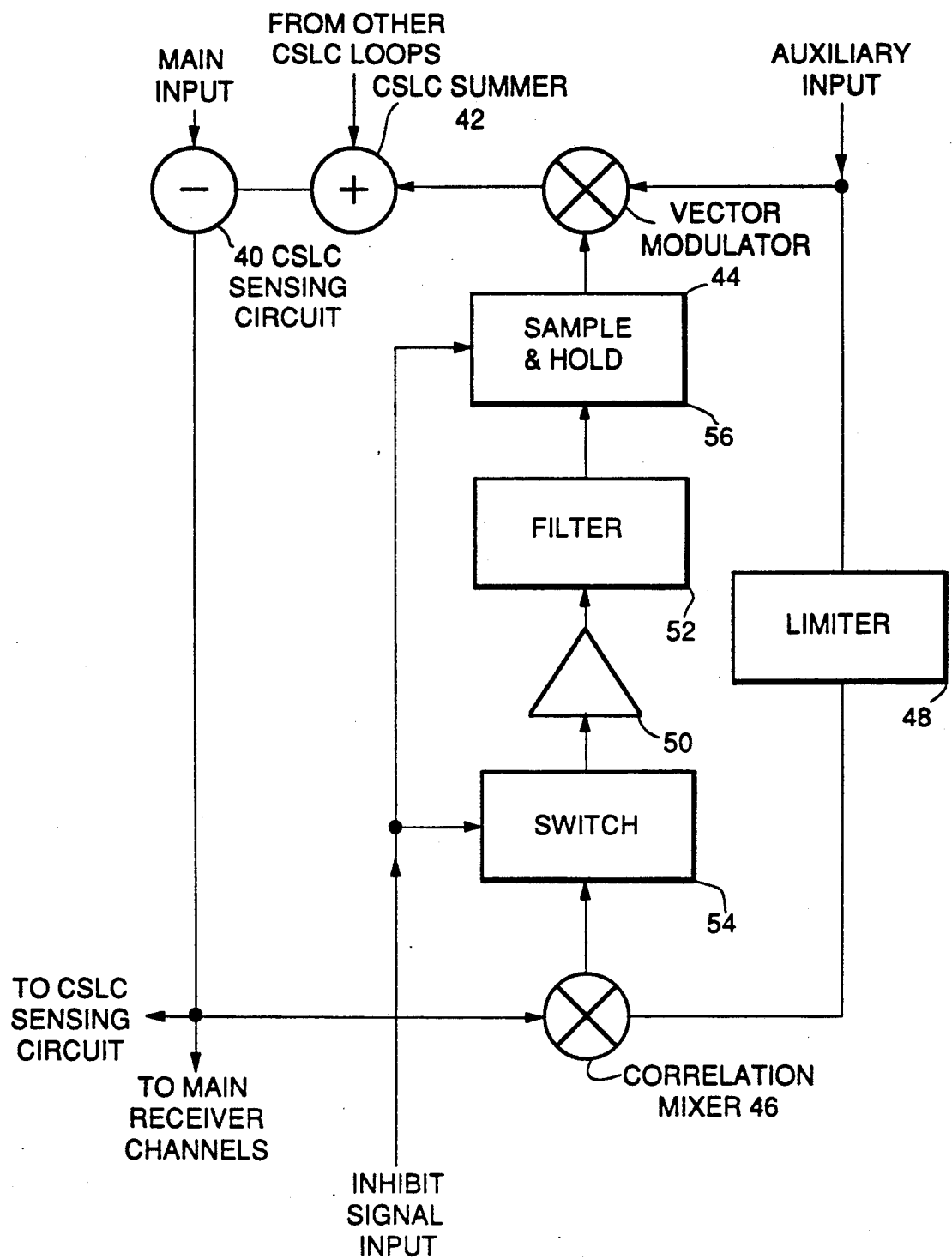
FIG. 2 shows a simplified block diagram of a coherent side lobe cancellation loop with its inhibit circuitry.

FIG. 2 shows a simplified block diagram of a coherent side lobe cancellation loop with its inhibit circuitry. All loops used in the system have identical inhibit circuits. Absent an inhibit signal, the coherent side lobe cancellation loop operates in normal fashion. The main input signal first goes to subtracter 40 where the output from vector modulator 44 is coherently subtracting from it. Since multiple coherent side lobe cancellation loops are used, the outputs from all of the vector modulators are first coherently summed in coherent side loop cancellation summer 42 before the subtraction process is accomplished. This coherent side loop cancellation residue is then sent to the coherent side loop cancellation sensing circuits, the main receiver channel for moving target indicator processing, and to the in-phase and quadrature channel correlation mixers for each of the loops. The residue is then mixed in correlation mixer 46 with the version of the auxiliary input signal as limited by limiter 48. If the two signals into correlation mixer 46 are independent broadband signals, then the output spectrum of the mixer will be a broad band video signal. However, when the two input signals are broadband but perfectly correlated, the output spectrum of the mixer will be a delta function at 0 frequency. That is:

$$\delta(\nu) = \lim_{\Delta \to 0} \begin{cases} 0; & \nu < -\frac{\Delta}{2} \\ \frac{1}{\Delta}; & -\frac{\Delta}{2} < \nu < \frac{\Delta}{2} \\ 0; & \nu > \frac{\Delta}{2} \end{cases}$$

where $\nu$ = frequency and $\delta(\nu)$ is defined as the delta function.

Any deviations from perfect correlation spread the mixer output spectrum and this spread reduces the cancellation performance of the loop. The mixer output is then amplified in amplifier 50, processed through narrow band loop filter 52, and then used to multiply the auxiliary intermediate frequency input by the appropriate vector to achieve the cancellation of the jamming on main input to the coherent side loop cancellation subtractor. For a fixed jammer location and a fixed antenna azimuth position, the in-phase and quadrature signals from the loop filters ideally will be direct-current voltages that modify the auxiliary signal in the vector modulator by a constant phase and constant amplitude Perfect cancellation could be achieved if the phase versus frequency and the amplitude versus frequency slopes of the main and auxiliary signals were identical over the signal bandwidth of the loop. This is, of course, not possible since in normal operation the antenna is scanning and the loop filter output must follow the amplitude and phase changes caused primarily by the main antenna side lobes scanning past the jammer. The auxiliary channel antennas have a much broader beamwidth, so the change in phase and amplitude of the auxiliary channel signals are at a substantially slower rate than is the main channel signal variation. When clutter appears on the main channel, it will be mixed in correlation mixer 46 with the jamming signal from the auxiliary channel. This cross product term of jamming and clutter will be a broad band signal, so it will be reduced substantially by the narrow band loop filters. However, the clutter output that occurs from the narrow band filters will cause a noise modulated clutter term to be reinserted back into the main channel. This noise modulated clutter signal will not cancel in the following moving target indicator circuits, so this represents a degradation in moving target indicator performance. The clutter that passes through the loop will be reduced in power level in proportion to the closed loop bandwidth of the loop to the signal bandwidth. The closed loop bandwidth is not a constant, but varies as a function of the auxiliary input voltage level. Over practical ranges of auxiliary input voltage levels, clutter reductions through the loop of 10 db to 20 db are typical for continuous clutter. Due to these reasons a technique to prevent clutter of greater than 20 db from entering the loop should prevent excessive degradation in moving target indicator performance.

During intervals when excessive clutter or signal is present on the main channel an inhibit signal is generated. The inhibit signal causes two actions to occur in the loop indicated in FIG. 2. First, it opens switch 54 at the output of correlation mixer 46 so that no input is accepted into the loop during this interval. This prevents the large signals from disturbing the loop operation. Secondly, and simultaneously, it causes a sample-and-hold circuit 56 to sample the loop filter output, which prevents the loops from relaxing during this interval. This sampled output is then applied to vector modulator 4 so that jamming cancellation can continue during the inhibit interval. Since the relative amplitude and phase of the main channel vs. the auxiliary channel signals change only at the antenna scanning rate, very little degradation of cancellation will occur during the inhibit signal intervals. The time constants of the loops are designed so that full jammer acquisition can occur in about 25 microseconds for high level jammers. Consequently, for a 250 microsecond pulse repetition interval, about 10 percent of the surveillance volume must be clutter free (i.e., have clutter below the 20 db threshold on the main channel) to maintain continuous jamming cancellation.

If clutter is present on the auxiliary channel during loop operation, this clutter will be multiplied by the vector modulator and inserted back into the main channel. If it is large enough, it will exceed the main channel threshold and generate an inhibit gate in the same way large clutter on the main channel would do. On a hit-to-hit basis, the vector modulator coefficients change quite slowly so that this auxiliary channel clutter appearing on the main channel will cancel in the moving target indicator circuits. However, when a jammer first turns on, it will take at least three pulse repetition intervals to achieve moving target indicator cancellation.

Figure 3A:
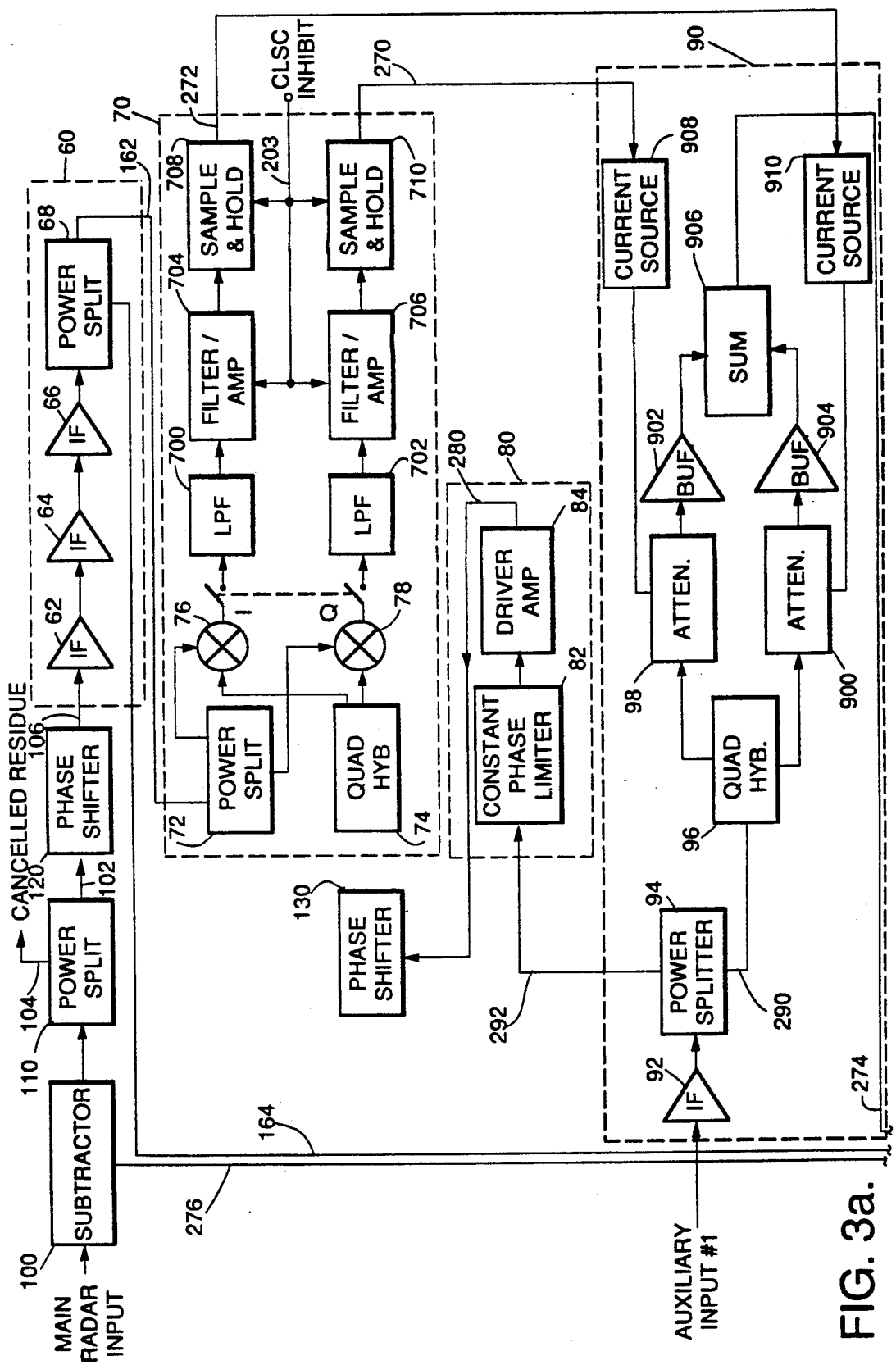
FIGS. 3a and 3b show a detailed implementation of a two-loop canceler.
Figure 3B:
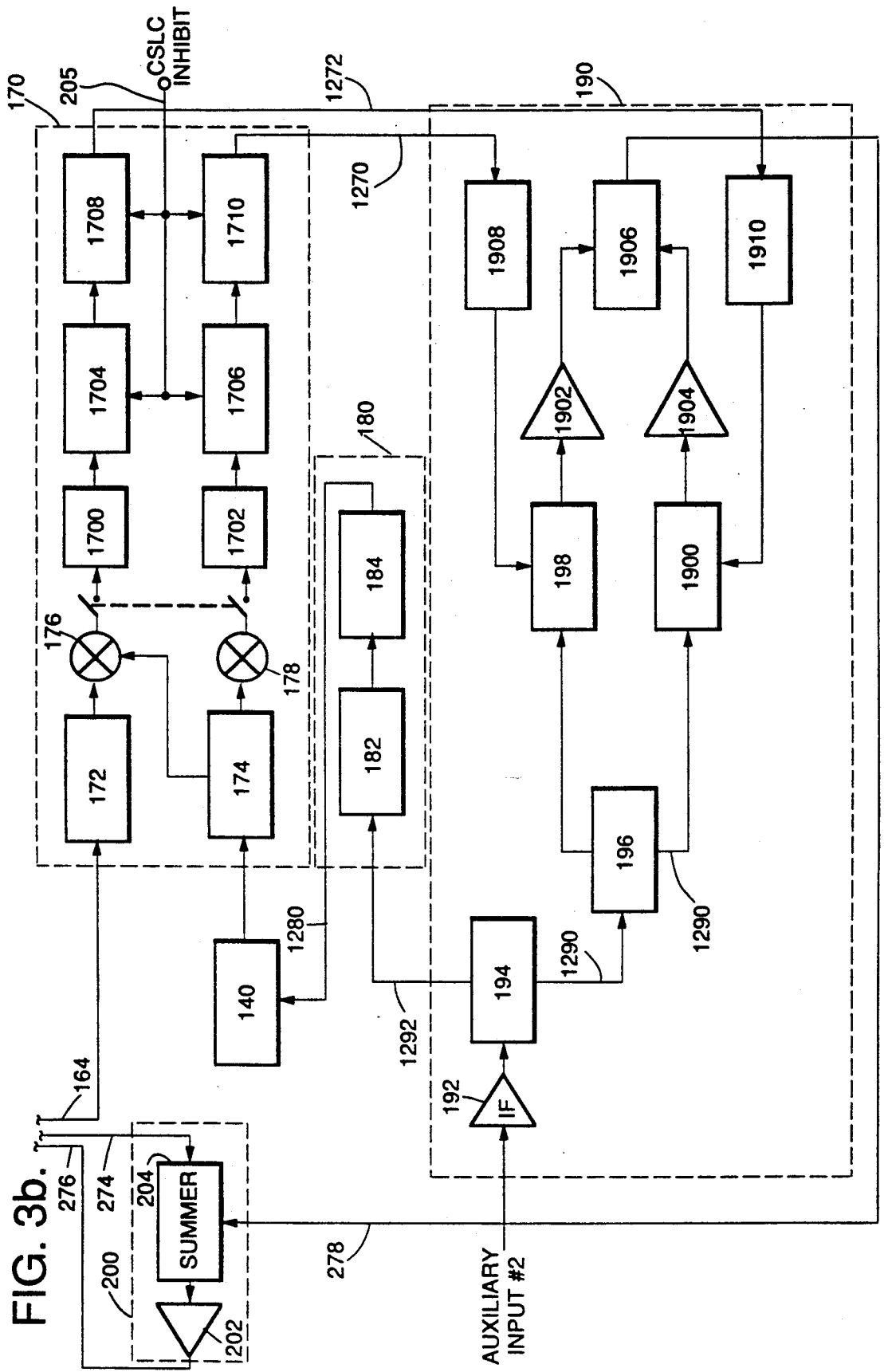

Referring now to FIG. 3 which shows a two-loop coherent side lobe canceler system, the invention will now be explained in greater detail. Subtractor 100 receives both the main radar input and the output from coherent side lobe cancellation summer 200. The resulting coherent side lobe cancellation residue is then applied to power splitter 110 which furnishes the resultant signal to the coherent side lobe cancellation sensing circuits by means of a lead 104 and also to phase shifter 120 by means of lead 102. The signal from phase shifter 120 on the lead 106 is applied to radar amplifier 60 where it is applied to intermediate frequency amplifier 62. After two additional stages of intermediate frequency amplification in intermediate frequency amplifiers 64 and 66, the amplified signal is applied to power splitter 68. The output from power splitter 68 is applied by means of leads 162 and 164 to correlation filter circuits 70 and 170 respectively. The signal as applied to correlation filter circuit 70 by means of lead 162 is applied to power splitter 72, the outputs therefrom being applied to correlation mixers 76 and 78 which are controlled by an in-phase and a quadrature signal received from a quadrature hybrid 74. The correlation mixers 76 and 78 provide in-phase "I" and quadrature "Q" components applied respectively through low-pass filters 700 and 702, respectively, to filter amplifiers 704 and 706. The filtered outputs from filter amplifiers 704 and 706 are applied respectively to sample-and-hold circuits 708 and 710, forming respective outputs 272 and 270 from correlation filter circuit 70. The filtered output signals from leads 272 and 270 are applied to respective current sources 910 and 908 of vector modulator unit 90, the signals resulting therefrom being applied respectively to attenuators 900 and 98. The signal from Auxiliary input number 1 is applied through intermediate frequency amplifier 92 to power splitter 94, one output of which on a lead 290 is applied to quadrature hybrid 96 providing in-phase and quadrature signals to attenuators 98 and 900, attenuator 98 receiving the quadrature signal and attenuator 900 receiving the in-phase signal, attenuators 98 and 900 being also respectively responsive to current sources 908 and 910. Signals provided by attenuators 98 and 900 are applied through respective buffer units 902 and 904 to a summing circuit 906 which applies a combined and rotated vector signal through a lead 274 to coherent side lobe cancellation summer 200 at summing circuit 204. The output signal from summing circuit 204 after amplification in amplifier 202 is applied to subtractor 100 by means of a lead 276. The signal output from power splitter 94 in vector modulator unit 90 appearing on lead 292 is applied to constant-phase limiter circuit 80 at constant-phase limiter 82, thence to driver amplifier 84 and by means of a lead 280 to phase shifter 130, which unit applies the resultant signal to quadrature hybrid unit 74 in correlation filter circuit 70.

The signal from auxiliary input 2 is applied through intermediate frequency amplifier 192 to power splitter 194, one output of which on a lead 1290 is applied to quadrature hybrid 196 providing in-phase and quadrature signals to attenuators 198 and 1900, attenuator 198 receiving the quadrature signal and attenuator 1900 receiving the in-phase signal, attenuators 198 and 1900 being also respectively responsive to current sources 1908 and 1910. Signals provided by attenuators 198 and 1900 are applied through respective buffer units 1902 and 1904 to a summing circuit 1906 which applies a combined and rotated vector signal through a lead 278 to coherent side lobe cancellation summer 200 at summing circuit 204. The output signal from summing circuit 204 after amplification in amplifier 202 is applied to subtractor 100 by means of a lead 276. The signal output from power splitter 194 in vector modulator unit 190 appearing on lead 1292 is applied to constant phase limiter circuit 180 at constant phase limiter 182, thence to driver amplifier 184 and by means of a lead 1280 to phase shifter 140, which unit applies the resultant signal to quadrature hybrid unit 174 in correlation filter circuit 170. Additional signal processing loops as required by additional auxiliary inputs will receive identical processing as in the two-loop case, explained in detail for simplicity and clarity.

Absent excessive clutter or signal, no coherent side lobe cancellation inhibit signal will be developed, however, during intervals when excessive clutter or signal is present, coherent side lobe cancellation inhibit signals will be developed and applied on leads 203 and 205, preventing the large signals from disturbing the loop operation as previously explained in reference to FIG. 2 supra. That is, the inhibit signal as applied by means of leads 203 and 205 respectively to correlation filter circuits 70 and 170 at filter amplifiers 704, 706, sample and hold circuits 708, 710 for correlation filter circuit 70 and at filter amplifiers 1704, 1706, sample-and-hold circuits 1708, 1710 for correlation filter circuit 170, causes two actions to occur in each loop indicated in FIG. 3. First, the inhibit signal prevents the acceptance of signals from low pass filters 700 and 702 into filter amplifiers 704 and 706 of correlation filter circuit 70, preventing also the acceptance of signals from low pass filters 1700 and 1702 into filter amplifiers 1704 and 1706 of correlation filter circuit 170. Secondly and simultaneously, the inhibit signal causes sample-and-hold circuits 708 and 710 in correlation filter 70 and sample-and-hold circuits 1708 and 1710 in correlation filter 170 to sample the loop filter output, thus preventing the loop from becoming inoperative during the interval in which the INHIBIT signal is applied. Thus, large signals are prevented from entering the coherent side lobe cancellation loops and generating erroneous transients in the output, also the previously sensed error signals are stored and used to continue cancellation of jammers until new data become available to update the error signals.

Figure 4:
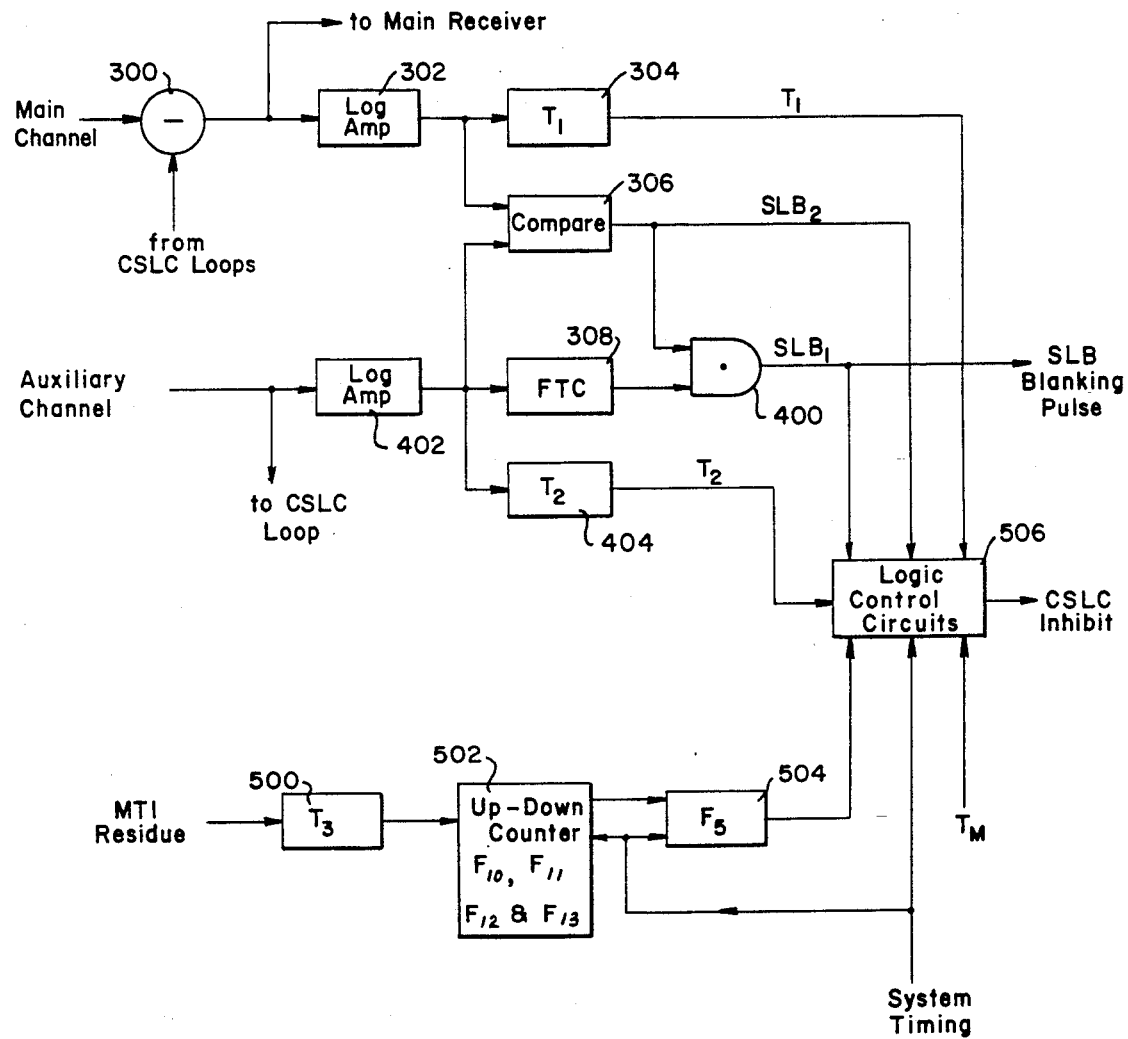
FIG. 4 shows a simplified block diagram of the coherent side lobe cancellation sensing circuits and logic.

Referring now to FIG. 4, which shows a simplified block diagram of coherent side lobe cancellation sensing circuits and associated logic control, the generation of the INHIBIT signal will be explained in detail. The main channel coherent side lobe cancellation residue is processed through a logarithmic amplifier 302 and then sent to both a threshold circuit 304 and to a comparison circuit 306. The threshold circuit 304 generates a true signal $T_1$ in real time whenever its threshold, which is, for example, +20 db above the receiver rms noise, is exceeded. The signal from one of the auxiliary channels is split and a portion of it is processed through a logarithmic amplifier, 402, and then sent to the comparison circuit 306, a fast time constant circuit 308, and to a threshold circuit 404. Comparison circuit 306 generates a true signal $SLB_2$ in real time whenever the auxiliary channel signal is, for example, 3 db larger than the main channel signal. The receiver noise levels on the main and the auxiliary channels are set equal at the comparison circuit so that accurate comparisons can be made. The threshold circuit 404 generates a true signal $T_2$ in real time whenever its threshold which is, for example, 10 db above receiver noise, is exceeded. The fast time constant circuit 308 differentiates the auxiliary channel logarithmic signal, the time constant is set to, say, approximately 25 microseconds (so that short pulses and the leading edge of long pulses are passed through this circuit). If these pulses are time coincident with the true state of $SLB_2$, an $SLB_1$ gate indicating the auxiliary signal is greater than the main signal is generated in real time at AND gate 400. In non-pulse compression modes the $SLB_1$ gate is also used to generate a blanking gate in the processor.

For purposes of example assume that the first pulse repetition interval of each dwell will not contain a transmission, so that there will not be any clutter present at the receiver output. Although a dead time interval of this nature is an advantage to coherent side loop cancellation operation, it is not imperative. A threshold sensor 500 which is, say, 10 db above the moving target indicator rms noise level (for purposes of this example assume that moving target indicator noise level is 7.8 db above the receiver noise level) is used to sense the moving target indicator residue. The true or false state of threshold sensor 500 is sent to an up-down counter 502 which consists of flip-flops $F_{10}$, $F_{11}$, $F_{12}$, and $F_{13}$. This counter is implemented to count up one count each time threshold sensor 500 is true, and to count down one count each time threshold sensor 500 is false. Also, the counter is prevented from counting below all zeros or above all ones, so that it will stay in these states until the sense of threshold sensor 500 is inverted and it can count in the other direction. Flip-flop $F_5$ senses the state of counter 502 and thus effects the detection process. $F_5$ is set true, indicating that the inhibit process should be overridden, when the counter reaches a count of 11xx where the x's refer to a "don't care" state. Consequently, any count of 12 or above keeps $F_5$ in the true state. Likewise, any count of 0xxx (7 or less) causes $F_5$ to be reset to the false state.

In logic control circuits 506 the INHIBIT gate will become true during the transmitted pulse interval or if the INHIBIT override $F_1$ has not been set and either $T_1$ is exceeded or $T_2$ is not exceeded. Any one of these conditions causes the gate M to become true, indicating that an INHIBIT signal should be generated because of clutter or pulse interference. The coherent side lobe cancellation system will be allowed to operate when the combination $SLB_1$ is false, $SLB_2$ is true, $T_1$ is false, and $T_2$ is true. The combination $SLB_1$ false $SLB_2$ true, implies that the interference is not pulse interference. The coherent side lobe cancellation will be forced to operate whenever INHIBIT override flip-flop $F_1$ is true, and the transmitter is not transmitting. The operate condition sets the gate O true. A flip-flop $F_7$ is set true by M and false by O, thus, $F_7$ stores the previous state of M or O. Since gates M and O can both be false under certain conditions, the state of $F_7$ will remain in its previous state when this occurs. The actual inhibit signal sent to the coherent side lobe cancellation loop must be deterministic, so this gate is true only when either M is true or when $F_7$ and $\overline{O}$ are both true. The use of the INHIBIT gate in addition to the flip-flop $F_7$ allows the inhibit signal to occur in real time instead of just at the clock intervals.

The up-down counter may reach the count of 12 or more in uncancelled distributed clutter, but probably will not reach this count in uncancelled land clutter because of masking effects which would cause some of the range bins to have a low level of clutter. However, if substantial jamming residue is present, it will easily cross the 12-count detection threshold, thus generating the inhibit override signal, $F_1$.

The first time during a dwell that $F_5$ becomes true, indicating excessive residue, it will set the INHIBIT override flip-flop $F_1$ if the combination $F_1$, $F_2$, $F_3$, and $F_4$ are all false. Once $F_1$ is set, the inhibit signal generation is overridden. For instance, assume that this occurred because the jamming residue on the main channel was above $T_1$, thus causing a continuous INHIBIT signal. The INHIBIT override allows the coherent side lobe cancellation circuits to now attempt to acquire the jammer. As soon as some clutter-free areas are encountered (10 microseconds to 20 microseconds long), the loops will cancel the jamming below $T_1$. $T_1$ being false will cause $F_1$ to be reset and $F_2$ to be set. This combination of $F_1$ false and $F_2$ true implies successful acquisition. At the next clock interval $F_2$ will be reset and both $F_3$ and $F_4$ will be set. The true state of either $F_3$ or $F_4$ will prevent setting $F_1$ true, causing another INHIBIT override. $F_3$ and $F_4$ thus form a 2-bit counter that counts down one count on each transmitter trigger $T_m$. This provides a 3 pulse repetition interval memory that prevents another INHIBIT override until three additional pulse repetition intervals have passed. By way of recapitulation, the listing of coherent side lobe cancellation logic terms and their definitions follows:

DEFINITIONS OF CSLC LOGIC TERMS

M—Indicates an inhibit signal should be generated because of clutter or pulse interference.
O—Indicates that the CSLC should be operated.
$F_7$—Stores the previous state of M or O.
INHIBIT—This gate operates in real time.
$F_1$—Overrides inhibit action.
$F_2$—Implies acquisition is successful.
$F_3$ $F_4$—Prevent $F_1$ override more often than once every three PRI intervals.
$F_5$—Indicates MTI residue is excessive and it implies the residue is probably due to jamming rather than clutter.
$F_{10}$, $F_{11}$, $F_{12}$, $F_{13}$—Provide a detector to indicate extent of MTI residue.
$T_1$—Implies main channel signal is large.
$T_2$—Indicates auxiliary channel signal is large.
$T_3$—Inidcates MTI residue is large.
$SLB_1$—Auxiliary larger than main.

Figure 5:
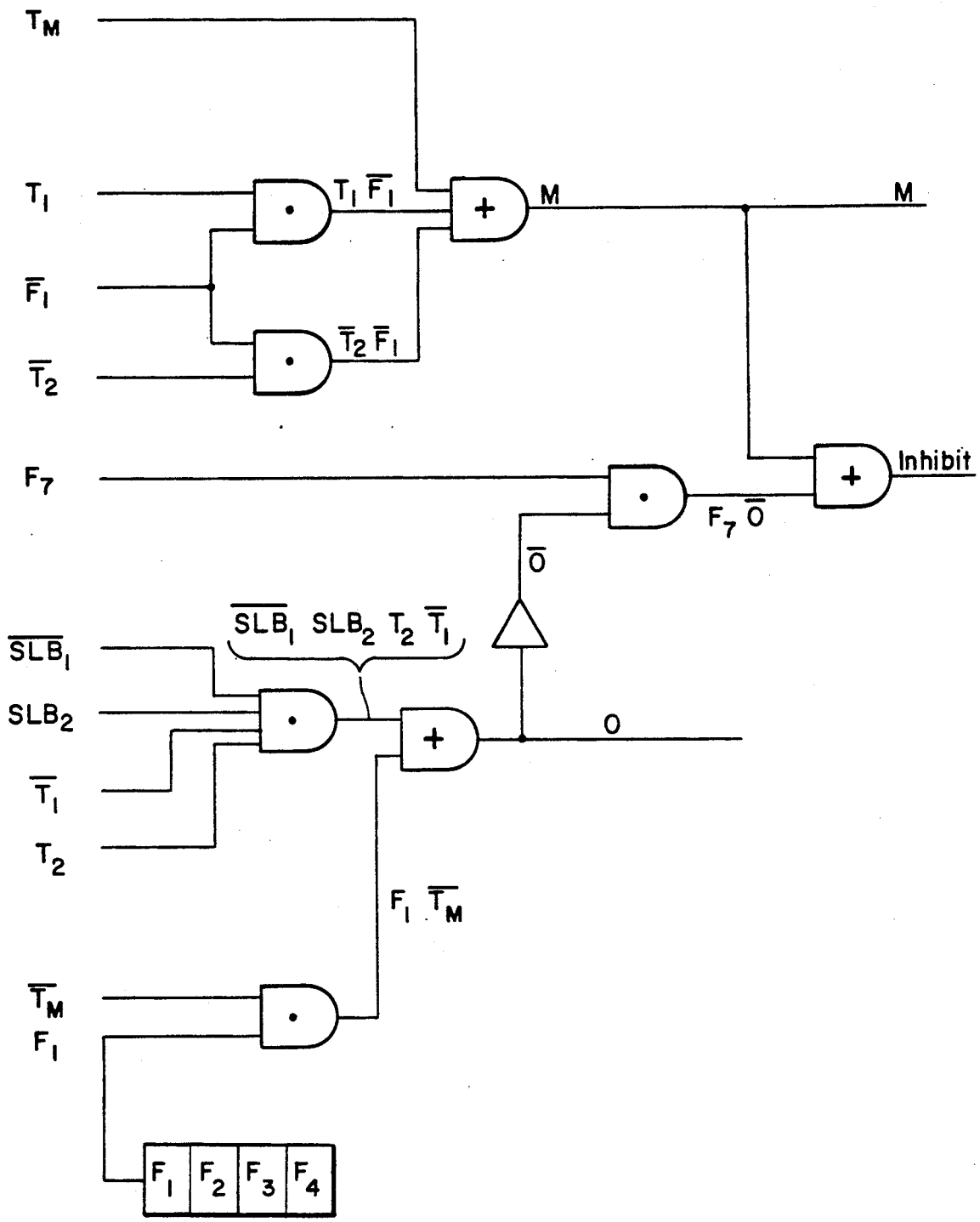
FIG. 5 represents the expansion of the logic and control circuits in FIG. 3.

The logic equations necessary to implement the coherent side lobe cancellation control and sensing circuits are:

CSLC CONTROL CIRCUIT LOGIC $M = T_m + \overline{T_2}F_1 + T_1\overline{F_1}$ $O\overline{SLB_1}\overline{SLB_2}T_2\overline{T_1} + F_1\overline{T_m}$ $SET\ F_7 = M + \overline{M}\ \overline{O}\ F_7$ $RESET\ F_7 = O + \overline{M}\ \overline{O}\ \overline{F_7}$ $INHIBIT = M + F_7\ \overline{O}$ $SET\ F_1 = F_5\overline{F_3}\overline{F_4}\overline{F_1}\overline{F_2}SLB_2$ $RESET\ F_1 = F_1T_1$ $SET\ F_2 = F_1\overline{T_1}$ $RESET\ F_2 = F_2$ $SET\ F_3 = \overline{F_1}F_2\overline{T_1} + T_m\overline{F_3}F_4$ $RESET\ F_3 = T_mF_3F_4 + T_mF_3\overline{F_4}$ $SET\ F_4 = \overline{F_1}F_2\overline{T_1}$ $RESET\ F_4 = T_mF_3F_4$ $SET\ F_5 = F_{13}F_{12}$ $RESET\ F_5 = \overline{F_{13}}$ $SET\ F_{10} = \overline{F_{10}}T_3 = \overline{F_{10}}\overline{T_3}\ (F_{11} + F_{12}F_{13})$ $RESET\ F_{10} = F_{10}T_3\ (\overline{F_{11}} + \overline{F_{12}} + \overline{F_{13}}) + F_{10}\overline{T_3}\ (F_{11} + F_{12} + F_{13})$ $SET\ F_{11} = F_{10}\overline{F_{11}}T_3 + \overline{F_{11}}T_3\overline{F_{10}}\ (F_{12} + F_{13})$ $RESET\ F_{11} = F_{10}F_{11}T_3\ (\overline{F_{12}} + \overline{F_{13}}) + F_{11}\overline{T_3}\ \overline{F_{10}}$ $SET\ F_{12} = \overline{F_{12}}F_{11}\ F_{10}T_3 + \overline{T_3}F_{13}\overline{F_{12}}\overline{F_{11}}\overline{F_{10}}$ $RESET\ F_{12} = F_{12}F_{11}F_{10}T_3 + T_3\overline{F_{13}}F_{12}F_{11}F_{10}$ $SET\ F_{13} = T_3\overline{F_{13}}F_{12}F_{11}F_{10}$ $RESET\ F_{13} = F_{13}\overline{F_{12}}\overline{F_{11}}\overline{F_{10}}\overline{T_3}$ Referring now to FIG. 5 and the coherent side loop cancellation control circuit logic equations, the operation of the logic circuits in box 506 of FIG. 4 will be explained in detail. M gate true, indicating that an INHIBIT signal should be generated because of clutter or pulse interference will be activated whenever the transmit time signal $T_m$ is true OR when both $T_1$ is true indicating that the signal in the main channel is above its threshold and $F_1$ is not set indicating that the inhibit action has not been overridden, OR $T_2$ is false indicating that the auxiliary signal threshold is not exceeded and $F_1$ is not set indicating no override on the INHIBIT action.

O gate true, indicating that the coherent side lobe cancellation should be operated, will be activated whenever $SLB_1$ is false AND $SLB_2$ is true, the combination indicating some type of interference other than pulse interference AND $T_2$ is true indicating that the $T_2$ threshold has been exceeded and $T_1$ is false, indicating that the $T_1$ threshold has not been exceeded OR $F_1$ is set indicating override of the inhibit action AND $T_m$ is false, indicating that the time is not transmit time.

INHIBIT gate true operating in real time and applying the coherent side lobe cancellation inhibit signal will be activated whenever M gate is activated OR O gate is not activated AND $F_7$, which stores the previous state of M or O, is set. $F_7$ is set true by M and false by O. Implementation of INHIBIT gate to be true only when either M gate is true or when $F_7$ and $\overline{O}$ or both true causes INHIBIT gate action to occur in real time rather than only at clock intervals.

In summary, a coherent side lobe cancellation inhibit signal opens the input circuit to the coherent side lobe cancellation filter so no input signal is processed. However, the filter output is applied to a sample and hold circuit so that cancellation continues. A coherent side lobe cancellation inhibit signal is generated whenever large clutter or target signals are present in the main channel that exceed a threshold $T_1$. An inhibit signal is also generated whenever the auxiliary channel signal decreases below a selected threshold $T_2$ or during the time the transmitter is energized. The inputs to the coherent side lobe cancellation circuits are enabled only when the auxiliary signal is larger than the main signal (but not for short pulse intervals), the auxiliary signal is larger than a selected threshold $T_2$, and the main channel is less than its threshold $T_1$. If the jamming on the main channel exceeds the threshold level $T_1$, then the inhibit process is overridden as follows: the output level and extent of the moving target indicator residue is sensed. Whenever this residue exceeds a selected threshold $T_3$ as sensed by threshold circuit 500, FIG. 4, for a given length of time, the coherent side lobe cancellation inhibit circuitry is overridden, thus giving the coherent side lobe cancellation circuits their maximum opportunity to acquire. This override situation continues until the residue on the main channel drops below its threshold value $T_1$ indicating successful acquisition. The successful acquisition sets a flag so that the override on the inhibit circuit cannot occur again during the next three pulse repetition intervals, thus preventing the jamming stored in the moving target indicator delay lines from repeating the override on each pulse repetition interval. Two side lobe blanking gates are used in the control circuits to differentiate between short pulse interference and long pulse jamming. The $SLB_1$ circuit uses a fast time-constant circuit on its auxiliary input so that it will not respond to long term jamming after its initial response. The $SLB_2$ circuit uses dc coupling on its auxiliary channel so that it responds continually to long term jamming. Thus, the coherent side lobe cancellation loops are employed against long term jamming and the side lobe blanking circuitry is employed against impulse jamming.

Thus, there has been described an improved coherent side lobe cancellation system which allows a radar so equipped to operate in an environment of large clutter and/or interfering pulse signal strength without suffering degradation of coherent cancellation due to such environmental effects. Large signals, exceeding a given threshold signal level, are prevented from entering the coherent side lobe cancellation loops by the generation of an INHIBIT signal which effectively performs two main functions; first, the large signal causing the generation of the INHIBIT signal is not accepted into the coherent side lobe cancellation loop input because of the action of the inhibit signal so generated, and second, a sample-and-hold circuit causes the coherent side lobe cancellation loops to continue operation in much the same manner as prior to the sensing of the large disturbing signal by the coherent side lobe cancellation system. Upon the abatement of the disturbing large signal condition, the coherent side lobe cancellation loops resume normal operation.

What is claimed is:

1. A coherent sidelobe canceler for communications systems providing effective continued operation within environments of large clutter and high pulse interference comprising:
   A plurality of CSLC loops, each having;
   CSLC correlation filter means responsive inclusively to a CSLC residue output signal and a CSLC INHIBIT signal,
   CSLC limiter means responsive to an auxiliary input signal and providing a limited output signal to said correlation filter means,
   CSLC vector modulator means inclusively responsive to said auxiliary input signal and a signal provided as output from said CSLC correlation filter means;
   CSLC summing means responsive to the signal outputs from said vector modulator means and furnishing an output signal;
   CSLC subtractor means responsive to a main input signal and the output signal furnished by said CSLC summing means;
   CSLC sensing circuit means responsive to said CSLC residue and generating said CSLC INHIBIT signals.

2. A coherent sidelobe canceler as recited in claim 1, in which said CSLC correlation filter means comprises:
   correlation mixer means immediately responsive inclusively to said limited output signal as furnished by said CSLC limiter means and said CSLC residue output signal,
   switch means responsive inclusively to an output signal furnished by said correlation mixer means and said CSLC INHIBIT signal,
   switch means remaining in a closed condition when no CSLC INHIBIT signal is present and opening upon the application of said CSLC INHIBIT signal,
   amplifier means responsive to an output signal furnished from said correlation mixer means under the condition that said switch means remains in closed condition, however, said amplifier means receiving no input from said correlation mixer means under the condition that said switch means becomes open,
   narrow band filter means responsive to the output signal as furnished from said amplifier means,
   sample-and-hold means inclusively responsive to an output signal as furnished from said narrow band filter means and said CSLC INHIBIT signal.

3. The combination of claim 2 wherein said vector modulator means includes vector multiplication means operative upon said auxiliary input intermediate frequencies providing signal input to said CSLC summing means.

4. The combination of claim 2 wherein said communications system includes pulse transmitting and receiving means.

5. The combination of claim 4 wherein said pulse transmitting means includes a dwell time during a first pulse repetition interval, said dwell time containing no transmission.

6. The system as recited in claim 5 wherein said pulse transmitting and receiving means are inclusively responsive to system timing and transmit time signals to generate a CSLC INHIBIT signal during the time said transmitting means are energized.

7. A coherent sidelobe canceler as recited in claim 1, in which said CSLC sensing circuit means comprises:
CSLC logic means providing generation of a CSLC INHIBIT signal,
CSLC logic means providing gating means indicative of the condition that CSLC INHIBIT signal should be generated,
CSLC logic means providing gating means determinative of CSLC operation time.

8. The combination of claim 2 wherein said sample-and-hold means operates on presently derived signal output from said narrow beamed filter means under the condition that no CSLC INHIBIT signal is present.

9. The combination of claim 2 wherein said sample-and-hold means retains and operates on previously derived signal output from said narrow band filter means upon application of said CSLC INHIBIT signal to said sample-and-hold means.

10. A coherent sidelobe canceler for communications systems comprising:
CSLC subtractor means responsive to a main input signal and coupled to a main receiver and to the input of first amplifier means,
comparison means coupled to the output at said first amplifier means,
first threshold selection means coupled to the output of said first amplifier means,
second amplifier means responsive to auxiliary channel input signals and coupled to said comparison means,
fast time constant circuit means responsive to an output signal from said second amplifier means,
second threshold selection means coupled to said output signal from said second amplifier means,
first logic gating means responsive to an output signal from said comparison means and said fast time constant circuit means,
third threshold selection means responsive to a moving target indicator residue signal,
counter means coupled to said third threshold selection means,
bistable circuit means coupled to said counter means,
logic control circuit means responsive inclusively to output signals from said first threshold selection means, said comparison means, said first logic gating means, said second threshold selection means and said bistable circuit means.

11. A coherent sidelobe canceler as recited in claim 10 wherein said first amplifier means is a logarithmic amplifier.

12. A coherent sidelobe canceler as recited in claim 10 wherein said second amplifier means is a logarithmic amplifier.

13. A coherent sidelobe canceler as recited in claim 10 wherein said fast time constant circuit means is a differentiating circuit responsive to short pulses and leading edges of long pulses supplied to it as output signal from said second amplifier means.

14. A coherent sidelobe canceler as recited in claim 10 wherein said communication system includes pulse transmitting and receiving means.

15. The combination of claim 14 wherein said pulse transmitting means includes a dwell time during a first pulse repetition interval, said dwell time containing no transmission.

16. The system as recited in claim 14 wherein said pulse transmitting and receiving means are inclusively responsive to system timing and transmit time signals to generate a CSLC INHIBIT signal during the time said transmitting means are energized.

* * * * *